United States Patent
Lu et al.

(10) Patent No.: US 8,953,760 B2
(45) Date of Patent: Feb. 10, 2015

(54) METHOD IN A COMMUNICATION SYSTEM

(75) Inventors: Chenguang Lu, Sollentuna (SE);
Per-Erik Eriksson, Stockholm (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 173 days.

(21) Appl. No.: 13/814,271

(22) PCT Filed: Aug. 5, 2010

(86) PCT No.: PCT/SE2010/050875
§ 371 (c)(1),
(2), (4) Date: Feb. 5, 2013

(87) PCT Pub. No.: WO2012/018288
PCT Pub. Date: Feb. 9, 2012

(65) Prior Publication Data
US 2013/0142319 A1    Jun. 6, 2013

(51) Int. Cl.
*H04B 3/32* (2006.01)
(52) U.S. Cl.
CPC .................................. *H04B 3/32* (2013.01)
USPC ................. 379/93.08; 379/90.01; 379/93.05; 379/406.01; 375/350

(58) Field of Classification Search
CPC ...... H04B 3/32; H04M 11/062; H04L 1/0002
USPC .......... 379/93.08, 90.01, 92.03, 93.05, 93.06, 379/92.04, 3, 406.01, 406.08; 370/201, 370/290; 375/222
See application file for complete search history.

(56) References Cited

U.S. PATENT DOCUMENTS

| | | | |
|---|---|---|---|
| 7,548,599 B2 * | 6/2009 | Azadet | 375/350 |
| 2012/0224685 A1 * | 9/2012 | Schenk et al. | 379/406.08 |

* cited by examiner

*Primary Examiner* — Melur Ramakrishnaiah

(57) ABSTRACT

A method and arrangement are disclosed in a Vector Control Entity for enabling a fair bit rate distribution among lines of similar priority in a vectoring group, when applying partial vectoring in a DSL communication system. The method comprises calculating a rate balancing metric, RBM, for each line i within a priority group A, indicative of the ratio between the bit rate of a line i with a current vectoring resource allocation, and the estimated bit rate of line i assuming approximately no crosstalk within the vectoring group. The method further comprises allocating partial-vectoring resources to the line/s within the group A, based on the calculated RBMs, such as to reduce the difference in RBM between the lines. The method further comprises calculating an updated RBM for any line within the group A subjected to changes in vectoring resource allocation. The method may be iterated until certain criteria are fulfilled. The arrangement is adapted to enable the performance of the above described method.

17 Claims, 9 Drawing Sheets

METHOD IN A COMMUNICATION SYSTEM

TECHNICAL FIELD

The invention relates to a method and an arrangement in a DSL (Digital Subscriber Line) system, in particular to cancellation of crosstalk using partial vectoring.

BACKGROUND

Far-end crosstalk (FEXT) is a major problem significantly limiting the performance of DSL systems. An ITU-T standard (Telecommunication Standardization Sector of the International Telecommunication Union), G.993.5 [1], for cancelling FEXT by means of signal processing, has been developed. This crosstalk cancellation technology is usually referred to as "vectoring" or "DSM (Dynamic Spectrum Management) level 3" technology.

Vectoring technology is assumed to be the core technology of the next generation of DSL for cancelling the FEXT between DSL lines, and thus maximize the DSL system performance. Vectoring technology will play a very important role in FTTx (Fiber To The Node/Cabinet/Curb/Building/Home/Premises, etc.) business, because it enables offering 100 Mbps per user with DSL lines in the last hundred meters, i.e. the distance between the end of a fiber network and the CPEs (Customer premises Equipments).

A schematic downstream vectoring arrangement is illustrated in FIG. 1. The downstream vectoring arrangement shown in FIG. 1 comprises a precoder 102, for pre-cancelling of crosstalk. The precoder is located at the DSLAM (Digital Subscriber Line Access Multiplexer) side 106 of a DSL line bundle or cable 104. The cancellation of FEXT is done at the DSLAM side 106 of the DSL lines 110. Downstream FEXT is pre-cancelled by use of a precoder 102 in the DSLAM, while upstream FEXT is cancelled by use of an upstream crosstalk canceller in the DSLAM (not shown). According to an ITU-T recommendation, a way is provided to estimate the FEXT channel in both downstream and upstream, and to utilize the estimated channel to cancel the crosstalk To explain the vectoring principle, referring to FIG. 1 and without considering the background noise, the received signals $y_1, y_2, y_3, \ldots, y_n$ at the different CPEs 1-N can be expressed in matrix form as:

$$y = HPx \quad (1)$$

where $y = [y_1 \, y_2 \ldots y_N]^T$ and $y_i$ is the received signal at CPE i, $x = [x_1 \, x_2 \ldots x_N]^T$ and $x_i$ is the transmitted signal of line 1, H is the channel matrix, P is the precoding matrix doing crosstalk pre-cancellation, and $X^T$ denotes the transpose of the vector X.

Applying a simple zero-Forcing technique and setting:

$$P = H^{-1} \quad (2)$$

results in:

$$y = x \quad (3)$$

Thus, the received signal equals the transmitted signal, and thus no crosstalk is present in the received signal at the CPEs. Similarly, the upstream crosstalk can be cancelled by post-processing in an upstream crosstalk canceller at the DSLAM side.

Partial Vectoring

The vectoring technology is a very attractive solution for VDSL2 [2] cabinet deployment, where vectoring enabled VDSL2 DSLAMs are installed in cabinets where hundreds of lines, typically, are connected to the users. However, fully cancelling hundreds of lines is too costly in terms of signal processing. Therefore, partial vectoring is considered as a practical solution for vectoring by cancelling only a part of the crosstalk/ers to each line, preferably the "strongest" crosstalk/ers.

FIG. 2 and FIG. 3 show a simplified partial-vectoring system model for downstream and upstream, respectively. As shown in the system model, the partial vectoring system illustrated in FIGS. 2 and 3 is capable of cancelling a selected subset of the crosstalkers for each line. It has been shown that close-to-optimal performance can be achieved by using partial vectoring. When using partial vectoring, weak crosstalk/ers is/are left unprocessed, and therefore, the use of partial vectoring enables a significant reduction of the computational complexity and cost of vectoring systems.

However, there is a management issue to solve in partial vectoring, namely how to distribute the vectoring resources among the DSL lines, and how to determine which crosstalk/ers that should be cancelled on each line. To manage the partial vectoring capability, ITU-T G.993.5 [1] defines two new configuration parameters related to partial vectoring:

Target Data Rates: referring to the expected data rates, for downstream and upstream, respectively, which are achievable for a line when all lines in the vectored group are active.

Line priorities (LOW/HIGH): partial vectoring should initially allocate sufficient resources in such a way that the target data rate is met for all the lines in the vectoring group. Then, the remaining resources will be distributed to the lines with line priority HIGH first to improve their data rates above the target data rates until they reach the maximum data rates configured. If the maximum data rate condition is met for all the vectored lines with line priority HIGH, the remaining resources are allocated to vectored lines with line priority LOW to improve their data rates above the target data rate.

ITU-T G.993.5 [1] defines a vectoring initialization procedure, which enables vectoring. This procedure is illustrated in FIG. 4. It should be noted that only the steps related to crosstalk cancellation are shown in FIG. 4, in order to simplify the discussion. Basically, ITU-T G.993.5 defines a joining procedure in which the existing vectored lines, which are already in showtime, are not interfered by the joining lines, which initialize to enter showtime, and eventually the mutual crosstalk between lines are cancelled after certain steps. This defined procedure is very straight forward to apply for full vectoring. However, when applying partial vectoring, it is not clear how to support the requirements of target data rates and line priorities during initialization.

Further, when regarding the crosstalk to a specific line, it is not clear how to allocate vectoring resources in order to achieve the best possible result from the allocated vectoring resources. A line i may be subjected to crosstalk from a number of different other lines in the same vectoring group. The crosstalk from all the tones S of another line t to line i may vary over all the tones S of line i. Thus, it is a multi-dimensional problem to determine, and eventually cancel, the crosstalk from each tone of each other line to each tone of line i. It has not even been defined how to determine which crosstalk that is the "strongest" crosstalk to a line. In addition, lines may have different target rates and priorities, which should be regarded. All this taken together imply that the task of allocating partial-vectoring resources among lines and within lines is a problem which needs to be solved.

Since it is believed that partial vectoring is of great importance for field deployment for computational complexity reasons, there is a need to have a vectoring resource allocation method, which supports partial vectoring, configured data rates and line priorities.

SUMMARY

It would be desirable to enable efficient allocation of vectoring resources to the lines in a partial vectoring DSL system, with regard taken to target data rates and priorities of the lines. It is an object of the invention to enable improved cancellation of crosstalk in a partial vectoring DSL system. Further, it is an object of the invention to provide a method and an arrangement for vectoring resource management, which may be used e.g. in connection with initialization of lines when applying partial vectoring. These objects may be met by a method and arrangement according to the attached independent claims. Embodiments are defined by the independent claims.

According to a first aspect, a method is provided in a Vector Control Entity, for allocation of partial-vectoring resources in a DSL communication system. The method comprises calculating a rate balancing metric, RBM, for each line i within a priority group A, indicative of the ratio between the bit rate of a line i with a current vectoring resource allocation, and the estimated bit rate of line i assuming approximately no crosstalk within the vectoring group. The method further comprises allocating partial-vectoring resources to the line/s within the group A, based on the calculated RBMs, such as to reduce the difference in RBM between the lines. The method further comprises calculating an updated RBM for any line within the group A subjected to changes in vectoring resource allocation.

According to a second aspect, an arrangement in a Vector Control Entity is provided. The arrangement is adapted to allocate partial-vectoring resources in a DSL communication system. The arrangement comprises a functional unit, which is adapted to calculate a rate balancing metric, RBM, for each line i within a priority group A. The RBM is indicative of the ratio between the bit rate of line i with current vectoring resource allocation, and the estimated bit rate of line i when assuming approximately no crosstalk within the vectoring group. The functional unit is further adapted to calculate an updated RBM for any line within the group A, which is subjected to changes in vectoring resource allocation. The arrangement further comprises a functional unit, which is adapted to allocate vectoring resources to the line/s within the group A, based on the calculated RBMs, when partial-vectoring resources are to be allocated among the lines within the vectoring group. The resources should be allocated such as to reduce the differences in RBM between the lines.

The above method and arrangement may be used for enabling a fair rate distribution among lines of similar priority when applying partial vectoring. The parameter RBM enables a comparison of the relative bit rates of the lines, and thus enabling allocation of resources to the line/s having the lowest relative bit rate.

The above method and arrangement may be implemented in different embodiments. In some embodiments the allocation of partial-vectoring resources and a following update of RBM are repeated until one or more criteria are fulfilled. The criteria may be fulfilled when the lowest RBM is equal to or larger than a predetermined threshold, or, when there are not vectoring resources sufficient for cancelling the crosstalk from another line within the vectoring group to a line within the group A, left to allocate. Further, the criteria could be fulfilled when there are not vectoring resources sufficient for cancelling any crosstalk left to allocate. This feature enables ending of the allocation of partial-vectoring within a priority group when desired or needed. The procedure could e.g. continue in a group of lines having a lower priority than group A.

Further, in some embodiments, a line within group A is excluded from allocation of vectoring resources, if the bit rate of said line would exceed a predetermined maximal bit rate after a further allocation of vectoring resources. In some embodiments, a line within group A is excluded from further allocation of vectoring resources if the crosstalk from the other lines within the vectoring group to said line is approximately cancelled. This feature may ensure that the lines are not allocated more partial-vectoring resources than needed or desired.

In some embodiments, partial-vectoring resources are allocated to a line having a low RBM, as compared to the other lines within group A. This could e.g. be the line having the lowest RBM within the group A. This feature may ensure that partial-vectoring resources are allocated to the lines in a fair way, in terms of bit rate.

In some embodiments, partial-vectoring resources may be re-allocated from one or more lines having a high RBM within a priority group, when there are insufficient available vectoring resources left to allocate to a line which is to be joined to the vectoring group, or to a line which is to be upgraded to a higher priority. For example, partial-vectoring resources may be re-allocated from one or more lines having the highest RBM within a priority group. Thus partial-vectoring resources will be re-allocated from one or more lines having a high relative bit rate, i.e. a high RBM, as compared to other lines within the same priority group, and thus reduce the differences in relative bit rate between the lines. This is enabled by use of the RBM.

The embodiments above have mainly been described in terms of a method. However, the description above is also intended to embrace embodiments of the arrangement, adapted to enable the performance of the above described features. The different features of the exemplary embodiments above may be combined in different ways according to need, requirements or preference.

BRIEF DESCRIPTION OF THE DRAWINGS

The invention will now be described in more detail by means of exemplary embodiments and with reference to the accompanying drawings, in which.

DETAILED DESCRIPTION

Figure 1:
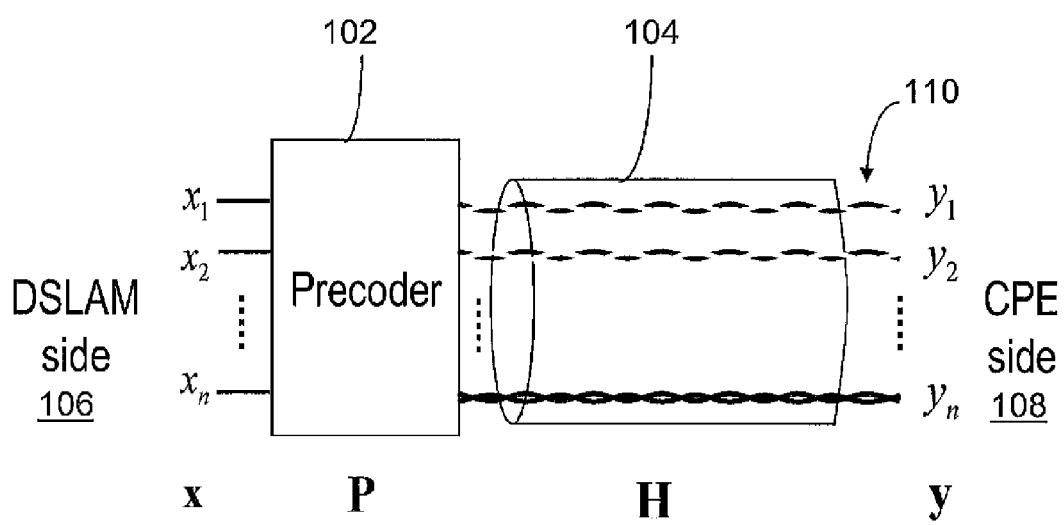
FIG. 1 is a schematic view illustrating a downstream vectoring arrangement, according to the prior art.
Figure 2:
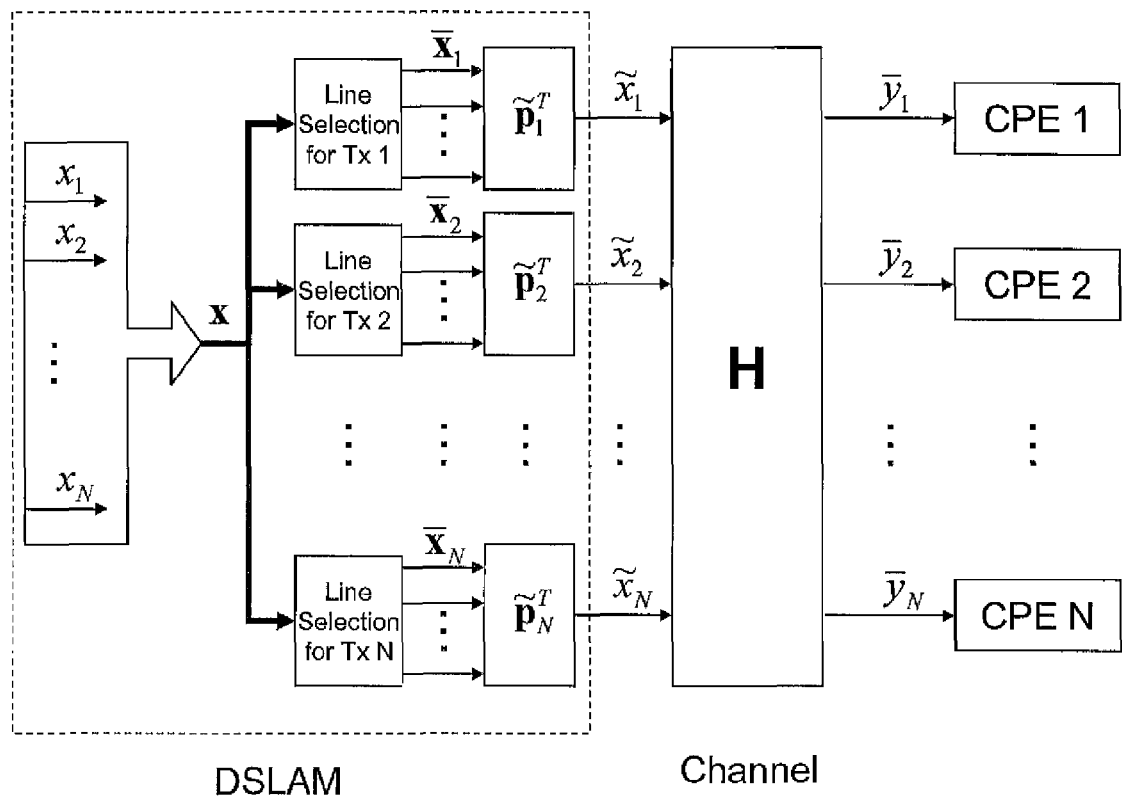
FIG. 2 is a block diagram illustrating a partial-vectoring system model for downstream, according to the prior art.
Figure 3:
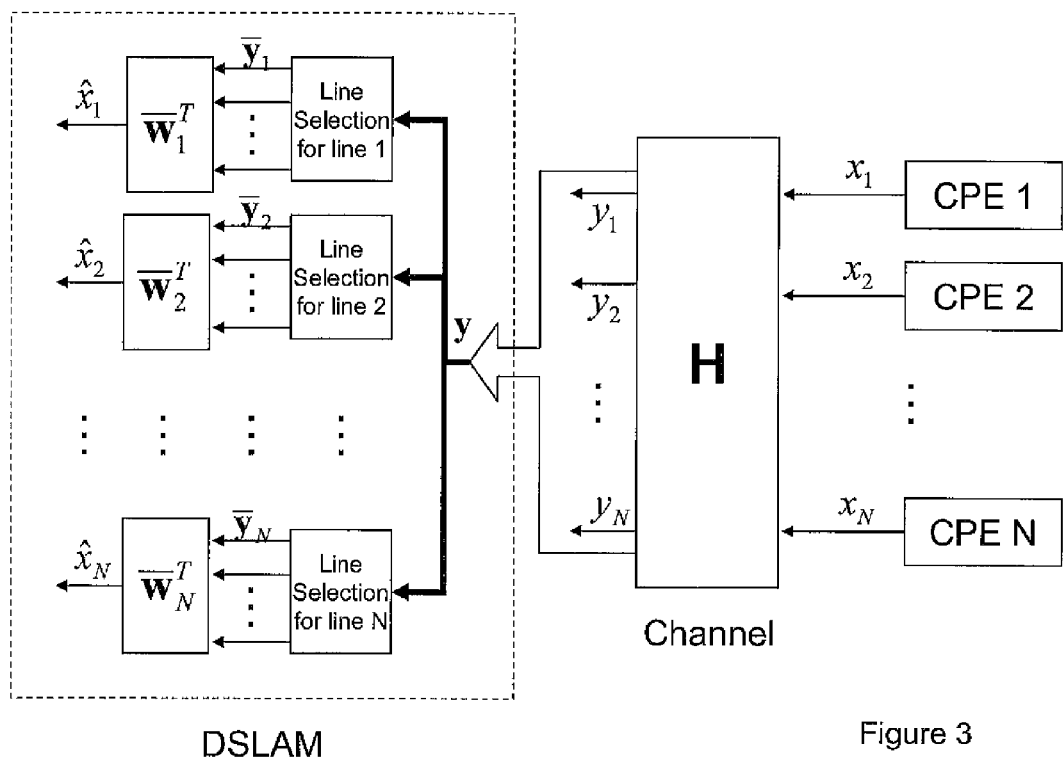
FIG. 3 is a block diagram illustrating a partial-vectoring system model for upstream, according to the prior art.

Briefly described, the invention enables balancing the rates among lines within the same priority group, such that each line achieves as equal percentage of its single line performance as possible. This is achieved by determining which line/s that should be allocated partial-vectoring resources, based on a rate balancing metric (RBM).

Some Definitions

Within this document, some expressions will be used when discussing the procedure of allocating vectoring resources, of which some will be briefly defined here.

The term "vectoring group" is used as referring to the lines associated with the same precoder for the downstream vectoring and the same canceller for the upstream vectoring.

The term "crosstalker" is used as referring to a line which subjects another line to crosstalk. When crosstalk to a line i is generated by and received from a line t, line t is a crosstalker of line i. One line may have a plurality of crosstalkers and may also be a crosstalker to a plurality of lines. Expressions like "cancel a crosstalker", and "cancel the crosstalk/er", are used in the meaning "cancel the crosstalk from a crosstalker to a line".

The term "same" as in "lines having the same priority", could also be interpreted as, or expressed as, "approximately the same", or "lines belonging to the same priority group".

A "joining line" is a previously inactive line, which is to be activated and incorporated in a vectoring group. The line is thus a joining line to the vectoring group.

Before describing the rate balancing metric and its use, another aspect of partial-vectoring resource allocation will be described.

Worst Crosstalk/er

Cognizant of the above described problems, it is realized that it would be convenient to have a parameter indicating which crosstalk, i.e. the crosstalk from which crosstalker, that is the "worst" crosstalk to a line, i.e. the crosstalk having the largest negative effect on the bit rate of the line subjected to crosstalk. Such a parameter should also not be too complex, in order to save computational resources and/or memory storage capacity. However, it is not evident how such a parameter should be obtained.

Crosstalk Effect Indicator (CEI)

Within this disclosure, a parameter to address at least some of the above mentioned problems is suggested, in the form of a Crosstalk Effect Indicator (CEI). A value of the CEI parameter can be determined, which indicates to which extent the rate of a line is affected by the crosstalk from a certain crosstalker. The CEI could also be denoted e.g. "capacity loss indicator", "rate improvement indicator" or "crosstalk strength indicator". A high CEI-value indicates that the bit rate of the line in question is highly reduced due to the crosstalk in question, i.e. also indicating that the bit rate of the line could be highly increased if said crosstalk was to be cancelled. Accordingly, a low CEI value indicates that the line in question is not very affected by the crosstalk in question, and that the bit rate of the line would not be particularly increased by cancelling said crosstalk. Each CEI-value is a number, associated with the crosstalk from one crosstalker to one line. Thus a CEI-value consumes little memory to record and is easy to use for ranking or sorting crosstalk/ers according to effect on the bit rate of the line subjected to the crosstalk. The CEI will be described in further detail below.

Computation of CEIs

Below, it will be described how CEIs can be calculated for the crosstalk from each crosstalker of interest, to a line.

Channel Estimation

According to ITU-T G.993.5 [1], the normalized crosstalk channel coefficients can easily be estimated from error sample feedback from CPEs in downstream and from the received signal, or error samples, at the DSLAM in upstream.

At tone k, the normalized crosstalk channel coefficients from line j to line i can be expressed as $$\bar{h}_{ij}^k = \frac{h_{ij}^k}{h_{ii}^k} \quad (4)$$

where $h_{ij}^k$ is the crosstalk channel coefficient from line j to line i at tone k, and $h_{ij}^k$ is the direct channel of line i at tone k. Here, the channel estimation algorithm is not given, since it is somewhat outside the scope of this solution.

Interference-to-Signal Ratio

Utilizing the channel estimation results, the interference-to-signal ratio from line j to line i at tone k can be expressed as:

$$ISR_{ij}^k = \frac{PSD_j^k}{PSD_i^k} \cdot |\bar{h}_{ij}^k|^2 \quad (5)$$

where $PSD_t^k$ is the transmit PSD of line t at tone k, |X| denotes the absolute value of X, and $\bar{h}_{ij}^k$ the normalized crosstalk channel coefficients from line j to line i at tone k, which can be estimated From the error sample feedback from CPEs in downstream and the received signal, or error samples, at DSLAM in upstream.

CEI Definition

For a line i, the CEI is defined as:

$$cei_{ij} = \sum_{k \in S_{tone}} \log ISR_{ij}^k \quad (6)$$

where log(X) denotes the natural logarithm of X, $ISR_{ij}^k$ the interference-to-signal ratio from line j to line i at tone k, and $S_{tone}$ is a subset of tones which are taken into account. The $S_{tone}$ could comprise all downstream or upstream tones of a line, but for computational complexity reasons, a subset of tones is preferable.

The CEI is thus an indicator of the impact or effect of the crosstalk from one line to another on the capacity or bit rate of the line subjected to the crosstalk. The definition of CEI reflects the capacity of a line i when being subjected to crosstalk from only one line, j. In the CEI, the tone-wise crosstalk strength variation is smoothed with respect to capacity. Further, it can be proved that cancelling the crosstalker associated with the largest CEI will give the largest capacity/bit rate improvement when canceling one of the crosstalkers. Thus, a CEI-value is suitable for determining how the bit rate of a line is affected by the crosstalk from a certain crosstalker. For example, a line 2 is considered as a stronger crosstalker to a line 1 than a line 3 when $cei_{12} > cei_{13}$. The complexity of the CEI calculation can be significantly reduced by reducing the number of tones in the plurality or set $S_{tone}$. As each CEI is just a single number for one crosstalk/er to one line, it consumes little memory to record and it is also easy to be used to sort or rank crosstalk/ers. Henceforth, the term "strongest", e.g. in the context "the strongest crosstalk/er", is used as referring to the crosstalk/er associated with the highest CEI, of a line.

New Line Control Parameters

In an exemplary embodiment, the following line control parameters are defined in addition to the CEI discussed above, to be used when managing partial vectoring initialization:

Crosstalk effect indicator list (CEIL);
Sorted crosstalker list (SXL);
Number of crosstalkers to be cancelled: M;
Out-of-domain noise-to-signal ratio vector (ODNSRV);
Even though the CEIL and the SXL here are described in terms of lists, there may also be embodiments of the invention which do not use an actual list, but instead keep track or record of the CEIs and the relation between different CEIs in some other way, e.g by associating a ranking value to each CEI of a line, and/or by parsing of CEI values in an unsorted list, record, or similar. The parameters could be named differently, if preferred.

For a line i, the above parameters are defined as follows:
The crosstalk effect indicator list (CEIL) is defined as:

$$\text{ceil}_i = \{cei_{i1}, \ldots, cei_{i(i-1)}, cei_{i(i+1)}, \ldots, cei_{i(N-1)}\} \quad (7)$$

where $cei_{ij}$ is the crosstalk effect indicator (CEI) of the crosstalk from line j to line i, and N is the number of lines in the vectoring group. There are two Crosstalk effect indicator lists, $ceil_i^d$ and $ceil_i^u$, for downstream (d) and upstream (u), respectively, as downstream and upstream use different tone sets, i.e. $S^d_{tone} \neq S^u_{tone}$.

The sorted crosstalker list (SXL) is defined as:

$$sxl_i = \{j_{i1}, j_{i2}, \ldots, j_{i(N-1)}\} \quad (8)$$

where $j_{it}$ is the crosstalker index of the tth crosstalker in the SXL of line i, and N is the number of lines in the vectoring group. The SXL-parameter sorts the crosstalkers of each line in the order of the CEI of the crosstalk from the crosstalkers. There are two sorted crosstalker lists, $sxl_i^d$ and $sxl_i^u$, for downstream (d) and upstream (u), respectively, as downstream and upstream use different tone sets.

The number of crosstalkers from which the crosstalk to line i is to be cancelled is defined as: $M_i$, where $M_i$ is the number of the strongest or worst crosstalk/ers, i.e. the crosstalk/ers having the highest CEIs, which are to be cancelled on line i in order for line i to achieve its target rate. Therefore, the crosstalk/ers to be cancelled are the first $M_i$ crosstalkers in $sxl_i$. $M_i$ is determined using the rate estimation algorithm, which will be described further below.

There are two numbers of crosstalkers to be cancelled, $M_i^d$ and $M_i^u$, for downstream and upstream, respectively, as downstream and upstream use different tone sets and have different target rates.

The out-of-domain noise-to-signal ratio vector (ODNSRV) is defined as:

$$odnsrv_i = \{odnsr_i^0, odnsr_i^1, \ldots, odnsr_i^{N_C-1}\} \quad (9)$$

where $odnsr_i^k$ is the out-of-domain noise-to-signal ratio (ODNSR) of line i on tone k, and $N_c$ is the number of tones per. The out-of-domain noise (ODN) is the noise from outside of the vectoring group, such as alien crosstalk from legacy DSL systems in the same binder/cable, the background noise at the DSL receiver and other noise from outside of the vectoring system. The ODNSR is the noise-to-signal ratio when there is basically no crosstalk between the lines in the same vectoring group.

Obtaining the ODNSR

The ODNSR can be obtained in different ways. For joining lines, i.e. lines which are initialized into a vectoring group, the ODNSR can be calculated as:

$$odnsr_i^k = \frac{ODN_i^k}{PSD_i^k \cdot Attn_i^k} \quad (10)$$

where $ODN_i^k$ is the out-of-domain noise power of line i at tone k, $PSD_i^k$ is the transmit PSD of line i at tone k, and $Attn_i^k = |h_{ii}|^2$ is the line attenuation of line i at tone k.

In this disclosure, the electrical length is used to estimate the line attenuation as $$Attn_i^k = 10^{-\frac{l_i\sqrt{k \cdot f_t}}{10}} \quad (11)$$

where $l_i$ is the electrical length of line i and $f_t$ is the tone spacing in MHz. The benefit of using the electrical length is that the electrical length is available before the decision process of which crosstalkers that are to be cancelled.

In addition, $ODN_i^k$ can be assumed or estimated based on lab measurements and/or theoretical models. The assumed value of $ODN_i^k$ should be selected conservatively to be an upper bound of the true out-of-domain noise level such that the out-of-domain noise is not underestimated.

For lines in showtime, the showtime signal-to-noise ratio (SNR) can be measured. Thus, for lines in showtime, which are already vectored, the ODNSR can be calculated as $$odnsr_i^k = \frac{1}{SNR_i^k} - \sum_{j \notin C_i} ISR_{ij}^k \quad (12)$$

where $SNR_i^k$ is the measured showtime signal-to-noise ratio at tone k, $C_i$ is the set of crosstalkers which are cancelled by the downstream precoder or upstream crosstalk canceller, and $ISR_{ij}^k$ is the interference-to-signal ratio from line j to line i at tone k. Actually, $$\sum_{j \notin C_i} ISR_{ij}^k$$

is the interference-to-signal ratio between the joining lines to the line i.

It is further realized that SNR term in (12) for a line, in fact, could be derived/estimated from the Quiet Line Noise (QLN) measurement, which is performed during initialization. For upstream, the QLN results can be obtained from the DSLAM receivers. For downstream, this would require that the QLN results are provided to the VCE/DSLAM side from the CPE side, where the downstream QLN measurement is performed. When QLN results are available, the SNR term in (12) for line i at tone k can be estimated as:

$$SNR_i^k = \frac{PSD_i^k \cdot Attn_i^k}{QLN_i^k} \quad (13)$$

where $PSD_i^k$ is the transmit PSD of line i at tone k, and $Attn_i^k = |h_{ii}|^2$ is the line attenuation of line i at tone k. And $Attn_i^k$ can be calculated using (11) with the electrical length. Therefore, when QLN results are available in initialization, the ODNSR should be calculated using (12) with (13), instead of using (10).

The ODNSR calculated using (12), based on a showtime SNR can be used in showtime to fine-tune the vectoring parameters and the cancellation coefficients because the showtime SNR is more accurate. This will be further described below.

Rate Estimation Algorithm

The raw bit rate of each line may then be estimated as:

$$\tilde{R}_i = f_s \cdot \sum_k \min\left(\text{round}\left(\log_2\left(1 + \frac{1}{\left(\sum_{j \notin C_i} ISR_{ij}^k + odnsr_i^k\right) \cdot \Gamma}\right)\right), 15\right) \quad (14)$$

where $f_s$ is symbol rate in Hz, min(X,Y) takes the minimal value of X and Y, round(X) rounds X to the nearest integer, $\Gamma$ is the SNR gap, $C_i$ is the set of crosstalkers which are assumed to be cancelled, $ISR_{ij}^k$ the interference-to-signal ratio from line j to line i at tone k, $odnsr_i^k$ is the out-of-domain noise-to-signal ratio of line i at tone k, and the number 15 is the maximum number of bits that can be used to modulate a tone.

The actual bit rate considering other overheads, i.e. coding overhead and sync symbol overhead, can be estimated as:

$$\hat{R}_i = \left(\tilde{R}_i - \frac{N_b \cdot f_s}{2}\right) \cdot \frac{256}{257} \cdot \left(1 - \frac{2 \cdot INP_{min}}{Delay_{max} \cdot f_s}\right) \quad (15)$$

where $N_b$ is the number of tones/subcarriers with at least 1 bit loaded, $INP_{min}$ is the minimum impulse noise protection (INP) configured in DMT symbols, $Delay_{max}$ is the maximum allowed delay in seconds and $f_s$ is symbol rate in Hz.

Both downstream and upstream bit rates, $R_i^d$ and $R_i^u$, can be estimated using (14) with the corresponding downstream and upstream tone set, respectively.

Modified Initialization Procedure

Figure 5:
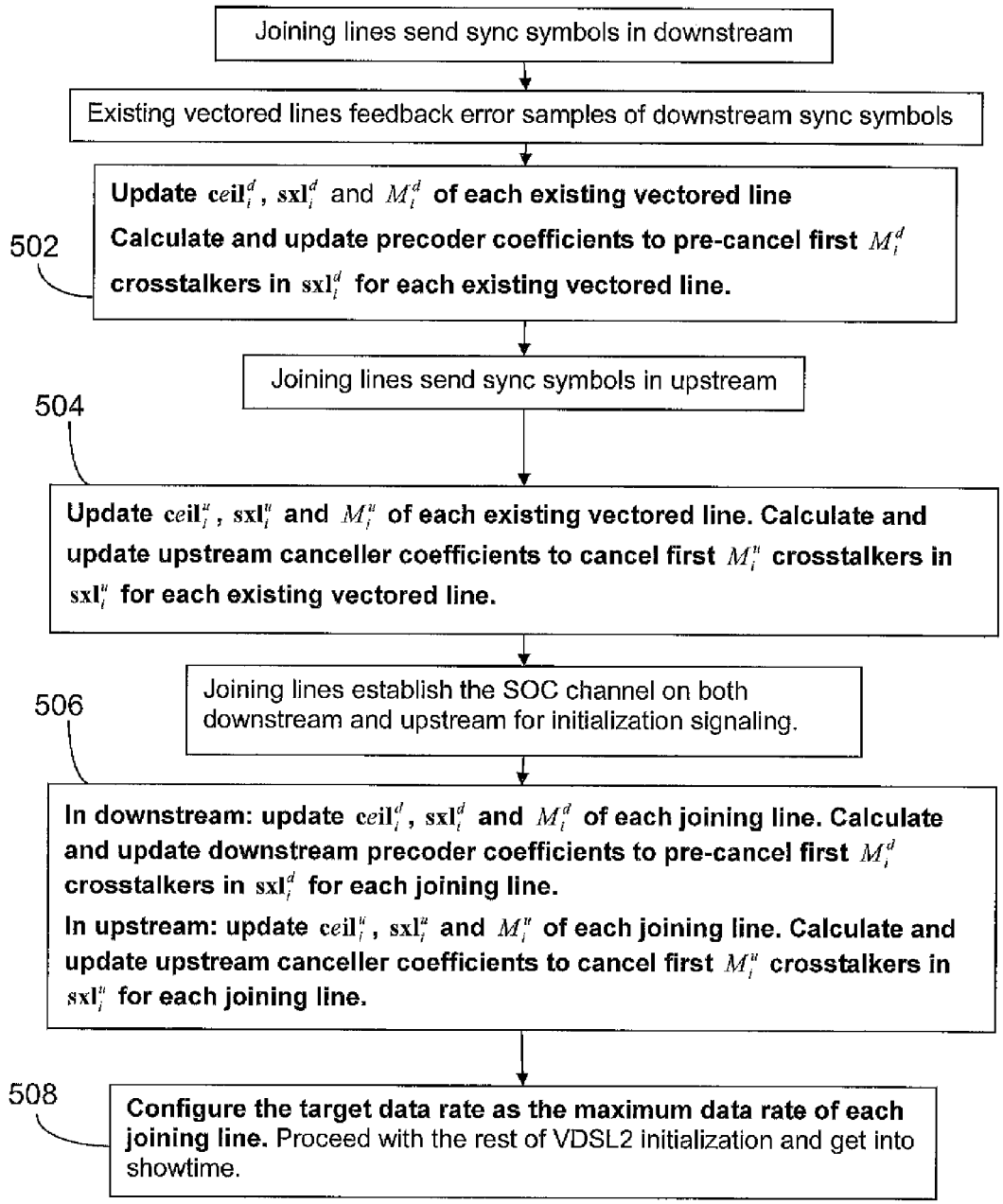
FIG. 5 is a flow chart illustrating modified initialization steps related to crosstalk cancellation.

An exemplary modified initialization procedure for partial vectoring is shown in FIG. 5. The illustrated procedure is involved with updating the new defined line control parameters and cancelling the crosstalkers accordingly. In FIG. 5, the steps comprising bold text illustrate the modified steps. The illustrated procedure can be used to ensure that the showtime bit rate of each line will be approximately the target rate, and not much higher. If the rate estimation works successfully, the showtime bit rate of each line should be equal to, or at least relatively close to, its target rate.

The modified procedure illustrated in FIG. 5 could be described as follows, concentrating on the modified actions. Initially, in an action 502, the downstream parameters $ceil_i^d$, $sxl_i^d$ and $M_i^d$ of each existing vectored line i are updated, based on downstream error samples. Then, the coefficients of the precoder are calculated and updated to pre-cancel, only, the first $M_i^d$ crosstalkers in $sxl_i^d$ for each existing vectored line i. Here, all SXLs are assumed to be sorted in a descending order, i.e. having the highest CEI-value first.

Further, in an action 504, the upstream parameters $ceil_i^u$, $sxl_i^u$ and $M_i^u$ of each existing vectored line i are updated, based on received upstream sync symbols or error samples. Then, the coefficients of the upstream canceller are calculated and updated to completely cancel, only, the first $M_i^u$ crosstalkers in $sxl_i^u$ for each existing vectored line i.

In a next action 506, the downstream parameters $ceil_i^d$, $sxl_i^d$ and $M_i^d$ of each joining line i, are updated based on downstream error samples of the joining lines. Then, the downstream precoder coefficients are calculated and updated to pre-cancel, only, the first $M_i^d$ crosstalkers in $sxl_i^d$ for each joining line i.

Further, in upstream, the parameters $ceil_i^u$, $sxl_i^u$ and $M_i^u$ each joining line i are updated based on received upstream sync symbols or error samples. Then, the coefficients of the upstream canceller are calculated and updated to cancel, only, the first $M_i^u$ crosstalkers in $sxl_i^u$ for each joining line i.

Then, in a next step 508, the target data rate of each joining line is configured as the maximum data rate. Then the joining lines proceed with the rest of VDSL2 initialization and get into showtime. The configuration here is optional to avoid over-allocation of the partial vectoring resources to each line, when the rate of each line is not allowed to change in showtime. However, this configuration is not needed when any rate adaptation technique (e.g. Seamless Rate Adaptation) is supported in showtime.

Fine-Tune Parameters and Update Coefficients in Showtime

During initialization of a line or a DSLAM, when QLN results are not available, the ODNSR may be estimated using (10). In (10), the out-of-domain noise power spectrum density is conservatively assumed based e.g. on offline measurement like lab measurement and/or theoretical models, or based on QLN measurements. Therefore, a rate estimation using (14) and (15) based on (10) is likely to underestimate the bit rate and thus over-cancel the number of crosstalkers. Even when QLN results are available, the ODNSR estimation in initialization by (12) and (13) is not as accurate as using (12) with the showtime SNR measurement. When joining lines have entered showtime, the showtime SNR may be measured, and thus the ODNSR may be re-estimated from the measured showtime SNR by use of (12) to improve the rate estimation. Accordingly, the number of crosstalkers to be cancelled, $M_i^d$ and $M_i^u$, in downstream (d) and upstream (u), respectively, may be re-determined. Finally, the precoder and uplink canceller coefficients could be updated to cancel only the first $M_i^d$ and $M_i^u$ crosstalkers in $sxl_i^d$ and $sxl_i^u$ for downstream and upstream, respectively Distribution of Remaining Vectoring Resource Among e.g. High Priority Lines After initialization, or otherwise, when all lines have been assigned partial-vectoring resources sufficient for reaching their target bit rate, there may still be vectoring resources left. These remaining resources could be distributed among the lines, such that the lines attain a bit rate, which is higher than the target bit rate, and possibly as high as the maximum bit rate configured or the maximum achievable bit rate without crosstalk within the vectoring group if the maximum bit rate is set to unbounded.

One way of handling the allocation of remaining resources could be to divide the remaining vectoring resources equally between high priority lines. However, such equal division would favor the short DSL lines, which are not as much subjected to crosstalk as longer lines. Thus, the short lines would most probably attain relatively higher bit rate improvements than the longer lines, when being allocated the same amount of vectoring resources, which may be considered unfair.

Nevertheless, after achieving the target rate of each line in a vectoring group, any remaining vectoring resources could be divided between the lines, e.g. following certain predetermined criteria or rules, e.g. until these lines attain their maximum bit rate. One of the simplest rules would then be to equally divide the remaining resources between the high priority lines, as mentioned above. If there were to be any vectoring resources left when the high priority lines have attained their maximum bit rate, the remaining vectoring resources could be distributed among the low priority lines, in accordance with the line priority definition in ITU-T G.993.5 [1].

The distribution of remaining or other vectoring resources could also be made on request from the management system, before all lines to be joined in the same vectoring group are joined. This could be useful when the lines are not fully used to provide service.

Cognizant e.g. of the fairness problem of distribution of remaining partial-vectoring resources, it is realized that it would be convenient to have a parameter indicating which line that is in largest need of vectoring resource allocation, in terms of achieved bit rate. Then a fair distribution balancing the need for vectoring resource among the lines in the same priority group could be achieved by balancing the parameter. However, the line conditions, such as e.g. loop attenuation and out-of-domain-noise level, are different from line to line.

Figure 6:
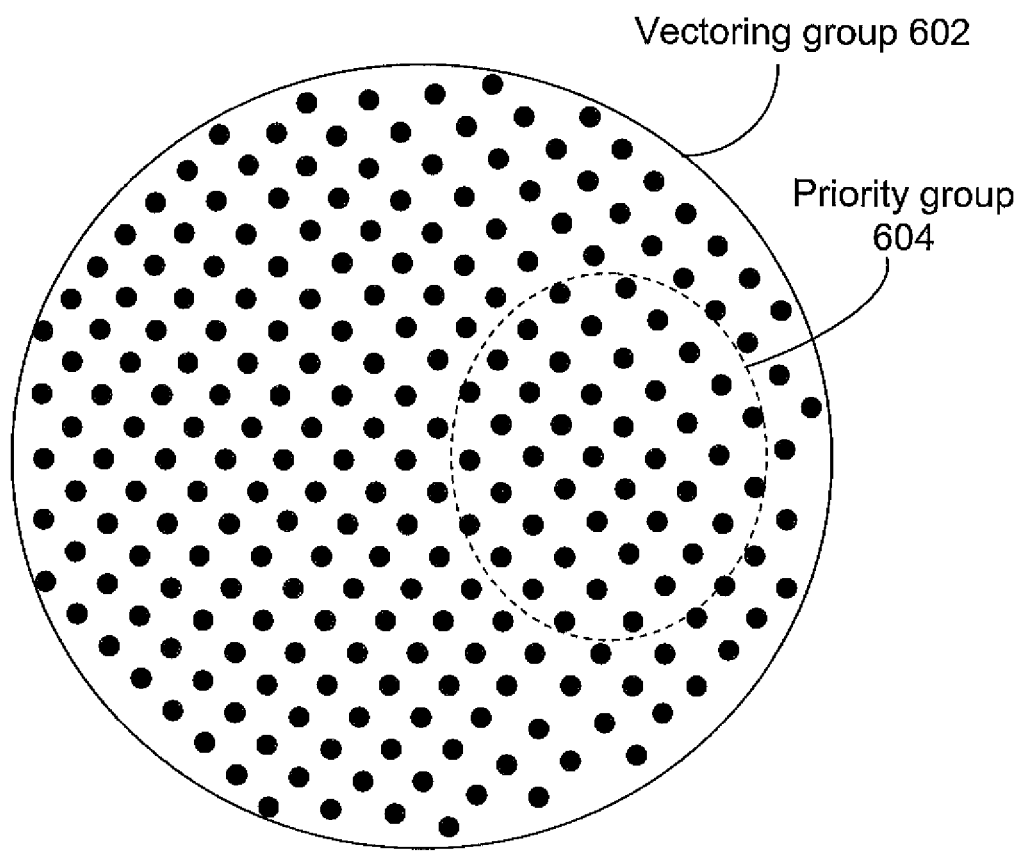
FIG. 6 is a schematic view illustrating a priority group.

It is realized that the achieved percentage of the maximum achievable bit rate without crosstalk within the vectoring group would be a fair parameter to compare between the lines. This parameter indicates how much potential bit rate that is left to be achieved by cancelling more crosstalkers. Balancing the percentage would enable each line in the same priority group to achieve more or less the same percentage of its maximum achievable rate. Thus, each line will enjoy the vectoring gain fairly A simplified illustration of a vectoring group 602 and a priority group 604 is shown in FIG. 6. However, it should be noted that the lines within a priority group do not need to be located together, as illustrated in FIG. 6, but could be scattered within a vectoring group or bundle 602. It should be noted that a fair distribution of partial-vectoring resources may not be the most optimal distribution in terms of total bit rate of a group of lines.

Rate Balancing Metric, RBM

Having knowledge of the parameters previously defined in this disclosure, e.g. the Crosstalk Effect Indicator, CEI, it is realized that a parameter in the form of a rate balancing metric, RBM, indicating which line that is in largest need of further vectoring resources, could be attained as follows:

For a line i, the RBM when the $M_i$ strongest crosstalkers of line i are cancelled, may be defined as:

$$RBM_i(M_i) = \frac{R_i(M_i)}{\overline{R}_i} \quad (16)$$

where $R_i(M_i)$ is the bit rate of line i when the $M_i$ strongest crosstalkers are cancelled, and $\overline{R}_i$ is the maximum achievable bit rate on line i without crosstalk within the vectoring group, i.e. when only ODN is present.

The RBM can be estimated as $$RBM_i(M_i) = \frac{\sum_k \log_2\left(1 + \frac{SINR_i^k(M_i)}{\Gamma}\right)}{\sum_k \log_2\left(1 + \frac{SODNR_i^k}{\Gamma}\right)} \quad (17)$$

where $SINR_i^k(M_i)$ is the signal-to-interference-and-noise ratio of line i at tone k assuming that the $M_i$ strongest crosstalkers of line i are cancelled, $SODNR_i^k$ is the signal-to-out-of-domain-noise ratio of line i at tone k, and $\Gamma$ is the SNR gap.

The estimation of $SINR_i^k(M_i)$ and $SODNR_i^k$ can be done with crosstalk channel estimation and measured SNR, which can be easily obtained from the vectoring initialization and showtime measurement, respectively.

The complexity of (17) can be reduced with the selection of a subset of the tones. Using a subset of the tones of line i is a good approximation, as the vectoring gains, e.g. from cancelling a crosstalker, are similar in all tones of a line.

There will be two RBMs for a line, $RBM_i^d$ and $RBM_i^u$, for downstream (d) and upstream (u), respectively, as the noise environment could be different in downstream and upstream.

As previously described, the sorted crosstalker list (SXL) of line i is defined as:

$$sxl_i = \{j_{i1}, j_{i2}, \ldots, j_{i(N-1)}\} \quad (18)$$

where $j_{it}$ is the crosstalker index of the tth crosstalker in the SXL of line i. The SXL is a list, where the crosstalkers of a line are sorted according to strength of crosstalk to said line. The crosstalker of $j_{it}$ is deemed as a stronger crosstalker than the crosstalker of $j_{it+1}$, where t=1, ..., N−1. Cancelling the $M_i$ strongest crosstalkers of line i corresponds to cancelling the first $M_i$ crosstalkers in $sxl_i$.

Number of Crosstalkers to Cancel

When defining the total number of crosstalkers, which the vectoring system can cancel given, e.g., a certain processing capacity, as $M_T$, the remaining vectoring resource could be expressed as:

$$M_R = M_T - \sum_{i=1}^{N} M_i \quad (19)$$

where N is the number of lines subjected to vectoring in the vectoring group. After further resource allocation, the number of crosstalkers to be cancelled on line i is $$\tilde{M}_i = M_i + M_i' \quad (20)$$

where $M_i$ is the number of crosstalkers cancelled to achieve the target bit rate and $M_i'$ is the number of crosstalkers to be cancelled using allocated remaining vectoring resources.

There are two numbers $\tilde{M}_i$, of crosstalkers to be cancelled, $\tilde{M}_i^d$ and $\tilde{M}_i^u$, for downstream and upstream, respectively, as both $M_i$ and $M_i'$ may be different for downstream and upstream.

After the remaining vectoring resources have been allocated, the downstream precoder coefficients may be calculated and updated to pre-cancel e.g. the first $\tilde{M}_i^d$ crosstalkers in $sxl_i^d$ for line i in downstream, and the upstream crosstalk canceller coefficients may be calculated and updated to cancel the first $\tilde{M}_i^u$ crosstalkers in $sxl_i^u$ for line i in upstream. Then, the improved bit rates can be achieved by seamless rate adaptation (SRA) or retrain.

Re-Allocation of Resources

Vectoring resources may be reserved, e.g. for the event that a line is to join the vectoring group. However, when there are no, or insufficient partial-vectoring resources reserved when a line is to join, e.g. a group of lines having the same priority, or be upgraded to a higher priority and thus be added to a new priority group, the vectoring resources required for such joining or upgrading could be re-allocated from other lines within the vectoring group. Such re-allocation could be based on calculated RBM-values in an "inverse" manner, as compared to how the RBM-values are used when allocating vectoring resources. The required vectoring resources, or part thereof, could be taken, or re-allocated, from one or more lines having a high RBM as compared to other lines e.g. in the same priority group.

Typically, vectoring resources should be re-allocated from the line/s having the highest RBM within a priority group, and thus having achieved the highest percentage of their maximum achievable bit rate. When there are lines of a lower priority than the joining or upgrading line/s, which have a bit rate exceeding their target bit rate, vectoring resources could be re-allocated from these lines of lower priority. Alternatively, or as well, vectoring resources could be re-allocated from the lines having the highest RBM-values within the same priority group as the joining or upgrading line/s. The above described "inverse" RBM re-allocation strategy will result in a fair re-allocation of partial-vectoring resources, in terms of relative bit rate.

Iterative Rate Balancing Algorithm

Below, an iterative rate balancing algorithm according to one embodiment will be described. The algorithm can be used to balance the bit rates in both downstream and upstream. To simplify the description, a general algorithm is given below with some general parameters without mentioning downstream or upstream. In practice, the general parameters should be replaced with the corresponding downstream or upstream parameters.

Algorithm Parameters

The following parameters are defined for the algorithm:
1. The total number of lines in the vectoring system: N.
2. The total number of crosstalkers which the vectoring system can cancel: M.
3. Number of crosstalkers to be cancelled: $M_i$
   $M_i$ is the number of the strongest crosstalkers which are to be cancelled on line i. Therefore, the crosstalkers to be cancelled on line i is the first $M_i$ crosstalkers in $sxl_i$.
4. The number of remaining crosstalkers the vectoring system can cancel:

$$M_R = M - \sum_i M_i$$

where $i \in \{1, 2, \ldots, N-1\}$.
5. List of lines to be balanced: $L = \{l_1, l_2, \ldots\}$ where $l_t$ is the tth line index in L.
6. The estimated bit rate of line i when the $M_i$ strongest crosstalkers of line i are cancelled: $R_i(M_i)$.
7. Maximum bit rate: $R_{MAX,i}$.
8. Rate balancing metric: $RBM_i$.

Rate Balancing Algorithm

The algorithm below will balance the RBM of each line. It works iteratively, such that each iteration adds one more crosstalker to be cancelled for the line which has the lowest RBM until all the crosstalkers of said line are to be cancelled. The algorithm ends when all vectoring resources are allocated to the lines or all lines have reached their maximum bit rates.

| | |
|---|---|
| Step 1: | Load current $M_i$ of each line in L. If there is no $M_i$ available, then $M_i = 0$. |
| Step 2: | Calculate $RBM_i(M_i)$ where $i \in L$. |
| Step 3: | Calculate $M_R = M - \sum_i M_i$ where $i \in \{1, 2, \ldots, N-1\}$ |
| Step 4: | If $M_R = 0$ or L is empty<br>    Algorithm ends<br>else<br>    Continue to step 5<br>end |
| Step 5: | Find $v = \arg\min_{i \in L}(RBM_i)$ and estimate $R_v(M_v)$ |
| Step 6: | If $M_v < N - 1$ and $R_v(M_v) < R_{MAX,v}$<br>    $M_v = M_v + 1$ |
| |     Update $RBM_v(M_v)$<br>    $M_R = M_R - 1$<br>    Go to step 4<br>else<br>    Remove v from L<br>    Go to step 5<br>end |

Figure 7:
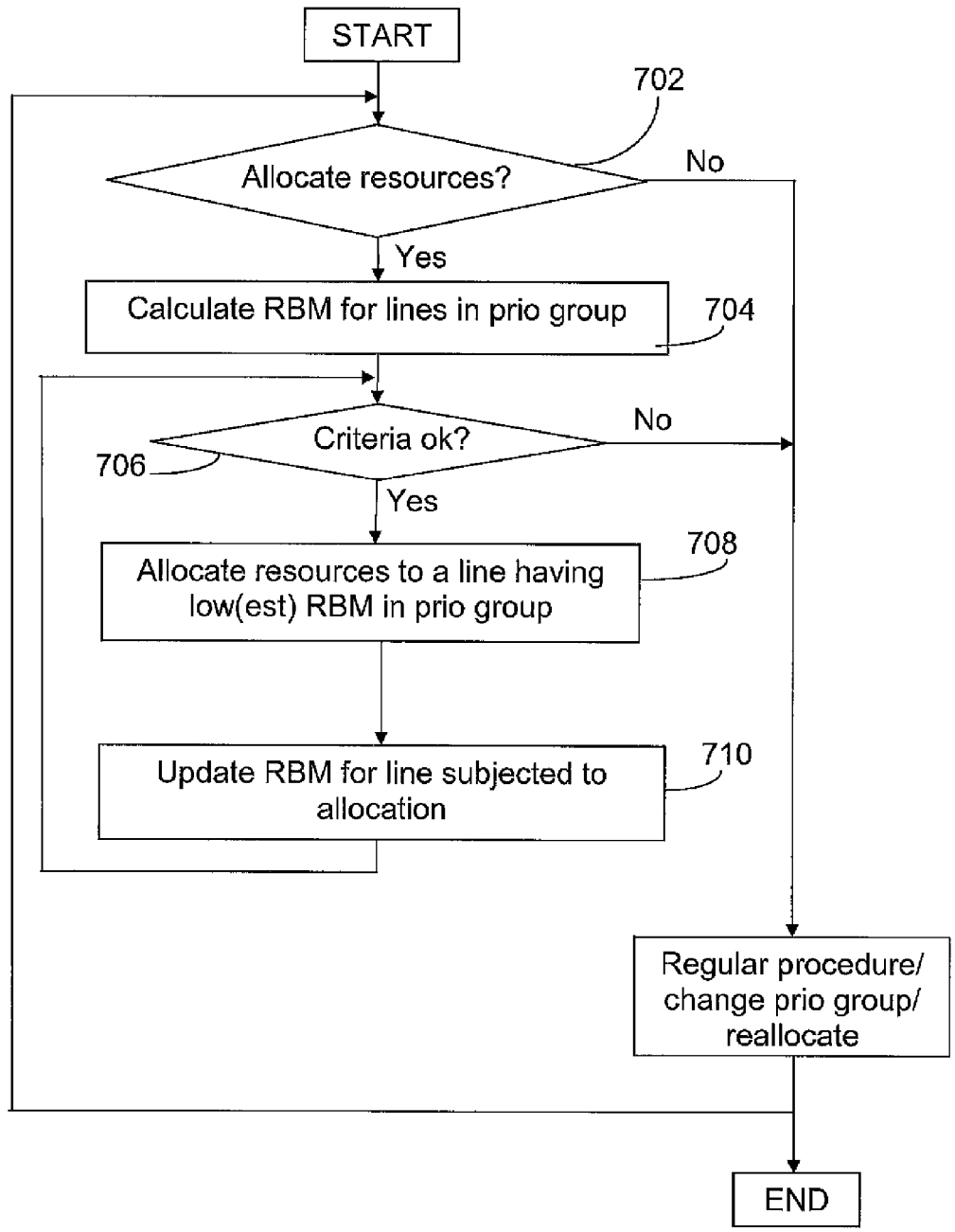
FIG. 7 is a flow chart illustrating procedure steps according to an embodiment.

Example Procedure, FIG. 7

An exemplary procedure for allocation of vectoring resources to lines of the same priority in a vectoring group, when applying partial vectoring, could be described as follows, with reference to FIG. 7. Initially, it is determined, in an action 702, whether vectoring resources should be allocated. The vectoring resources to be allocated could be e.g. the remaining resources after initialization of a number of lines. Alternatively, there are no remaining resources, but a need for resources to be re-allocated, e.g. to a line, which is to join the vectoring group.

When vectoring resources are to be allocated, RBMs are calculated for the respective lines in a group A of lines having the same priority, in an action 704. Each line will thus have an RBM, indicating how close the line is to attaining its maximum rate. More precisely, the RBM is indicative of the ratio between the bit rate of a line i with a current vectoring resource allocation, and the estimated bit rate of line i when assuming approximately no crosstalk within the vectoring group. In a next action 706, it may be determined whether any or all the lines in the group A have already attained the maximum rate, in which cases the procedure could remove the lines having attained their maximum bit rate from further allocation, or end the procedure, respectively.

In a next action 708, it is determined which of the lines in the group A that should be assigned vectoring resources, based on the calculated RBMs. Typically, this would be the line having the lowest RBM. The line having the lowest RBM is the line having the lowest relative bit rate among the lines in the group A, i.e. the line reaching the lowest percentage of its maximum rate. Then, vectoring resources are allocated to the determined line. The amount of resources allocated to the line should typically be sufficient for cancelling at least the crosstalk from the "worst" crosstalker, i.e. the crosstalk having the largest effect on the bit rate of the line.

After resources have been allocated to a line in action 708, the RBM for said line is updated in an action 710. Then, it may be evaluated, e.g. in action 706, whether there still are vectoring resources that should be allocated, and whether the lines have reached their maximum bit rates or a predetermined percentage thereof. When there are still vectoring resources to be allocated and the lines in group A have not yet reached e.g. their maximum bit rates, the procedure may return to action 708, where it is determined which next line that should be assigned vectoring resources. It could be the same line, but it could also be another line, which after the last allocation and RBM update has e.g. the lowest RBM.

Thus, the procedure may continue to allocate vectoring resources in an iterative manner until all lines in group A have attained e.g. their maximum bit rate or until there are no further resources to allocate. In case of re-allocation, the procedure may end when no further vectoring resources need to be re-allocated. Further, the process may end when the lowest RBM is equal to or exceeds a predetermined threshold, which does not necessarily need to correspond to that the lines have attained their maximum bit rate, but could correspond e.g. to a certain percentage of the maximum bit rate.

When the desired bit rates are attained in group A, or when there are no more vectoring resources to allocate, the crosstalkers associated with the highest CEIs may be cancelled for each line, using the vectoring resources allocated to the respective lines during the preceding procedure. Possible remaining vectoring resources may then be allocated within another group of lines having a lower priority than group A in a similar way as described above.

Further, when there are no, or insufficient partial-vectoring resources reserved for the event that a line is to join group A or be upgraded to group A, the vectoring resources required for such joining or upgrading could be re-allocated from other lines within the vectoring group.

Figure 8:
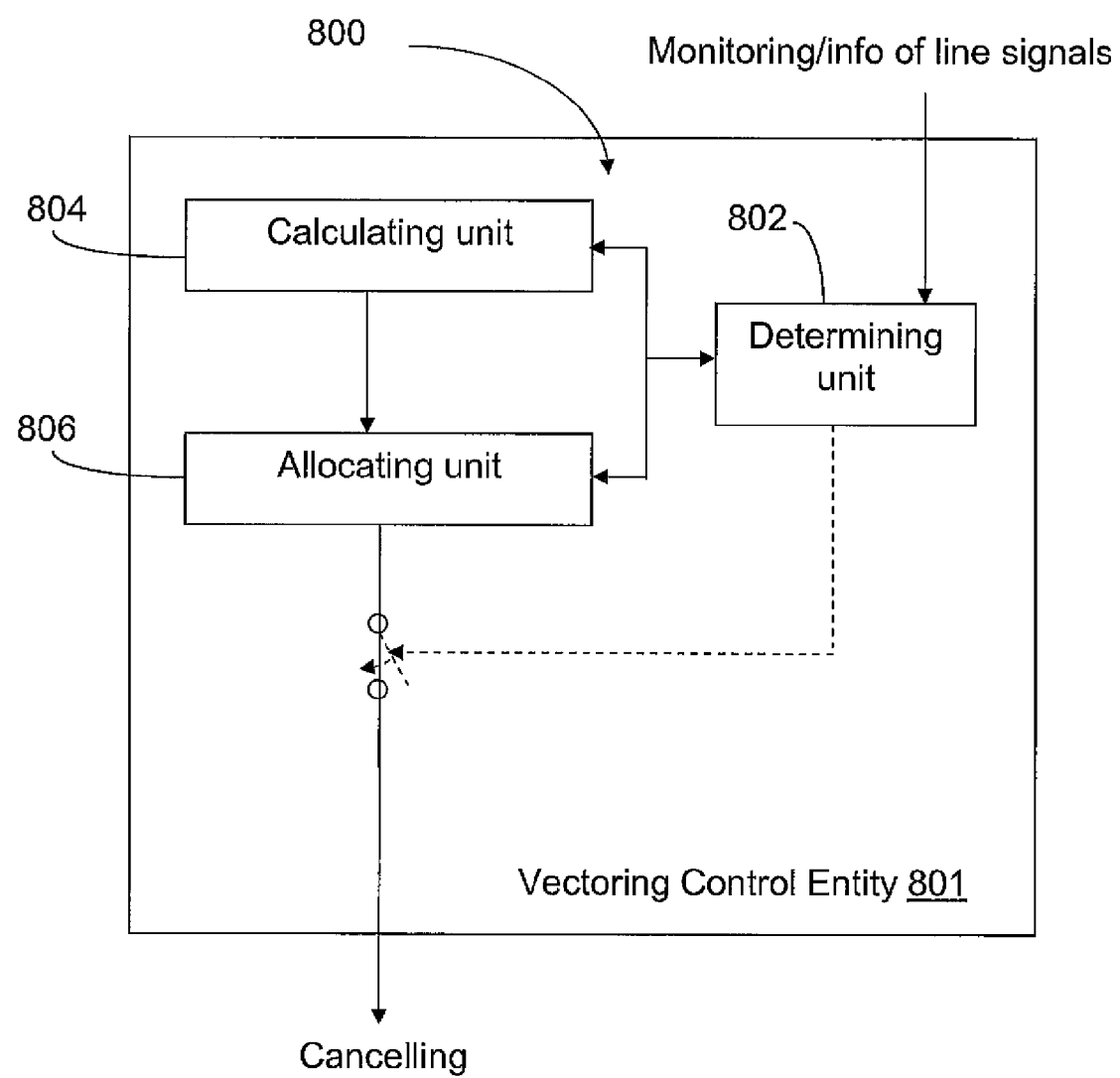
FIGS. 8 and 9 are block diagrams illustrating arrangements, according to embodiments.

Example Embodiment, FIG. 8

Below, an exemplary arrangement 800 in a VCE 801, adapted to enable the performance of the above described procedure, will be described with reference to FIG. 8.

The arrangement 800 comprises a determining unit 802, which is adapted to determine whether there are vectoring resources to be allocated among a group of lines having the same priority, or whether certain other predetermined criteria, e.g. concerning the lines, are fulfilled. For example, one such criterion could be fulfilled when a line has achieved a certain predetermined percentage of its maximum bit rate, and another criterion could be fulfilled when all lines in the group of lines having the same priority have achieved a certain predetermined percentage of their maximum bit rate, i.e. the lowest RBM is equal to or larger than a predetermined threshold.

The arrangement 800 further comprises a calculating unit 804, which is adapted to calculate a respective RBM for each line in a group A of lines having the same priority. The calculating unit 804 is further adapted to calculate an updated RBM for any line within the group A, which is subjected to changes in vectoring resource allocation.

The arrangement 800 further comprises an allocating unit 806, which is adapted to allocate partial-vectoring resources to the line/s within the group A, based on the calculated RBMs. In other words, the allocating unit 808 is adapted to determine which line/s that should be assigned partial-vectoring resources, based on the respective RBM of the lines. The partial-vectoring resources should be allocated such as to reduce the differences in RBM between the lines. Typically, this would imply allocating resources to the line having the lowest RBM. The allocated vectoring resources should, typically, be used to cancel the crosstalk having the largest negative impact on the bit rate of the determined line. The action of providing the results from the allocation unit 806 to e.g. a precoder is illustrated as a dashed arrow from the determining unit 802, controlling an equally dashed switch on the arrow from allocation unit 806.

Further, the allocation unit 808 may be adapted to re-allocate partial-vectoring resources from one or more lines within the vectoring group to a line joining group A or being upgraded to group A. Such re-allocation may be required when there are no, or insufficient, partial-vectoring resources reserved for the event that a line is to join group A or be upgraded to group A.

Figure 9:
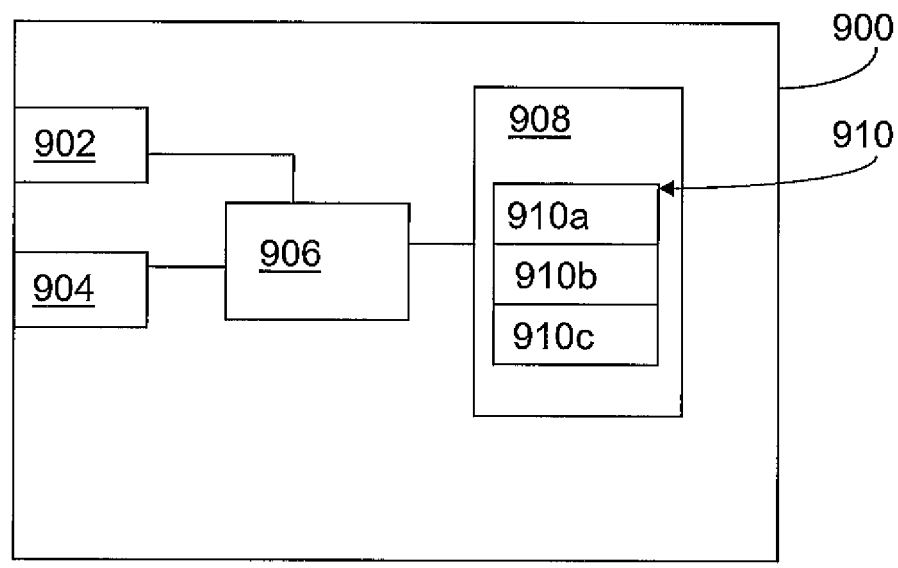

Example Embodiment, FIG. 9

FIG. 9 schematically shows an embodiment of an arrangement 900 in a Vectoring Control Entity, which also can be an alternative way of disclosing an embodiment of the arrangement in a Vectoring Control Entity illustrated in FIG. 8. Comprised in the arrangement 900 are here a processing unit 906, e.g. with a DSP (Digital Signal Processor) and an encoding and a decoding module. The processing unit 906 can be a single unit or a plurality of units to perform different actions of procedures described herein. The arrangement 900 also comprises the input unit 902 for receiving signals, such as information on the lines in a vectoring group, and the output unit 904 for output signal/s, such as, e.g. precoder update information. The input unit 902 and the output unit 904 may be arranged as one.

Furthermore the arrangement 900 comprises at least one computer program product 908 in the form of a non-volatile memory, e.g. an EEPROM (Electrically Erasable Programmable Read-Only Memory), a flash memory and a disk drive. The computer program product 908 comprises a computer program 910, which comprises code means, which when run in the processing unit 906 in the arrangement 900 causes the arrangement and/or the VCE to perform the actions of the procedures described earlier in conjunction with FIG. 1.

Hence in the exemplary embodiments described, the code means in the computer program 910 of the arrangement 900 comprises a determining module 910a, determining if there are partial-vectoring resources to be allocated, and whether certain other criteria are fulfilled. The computer program further comprises a calculating module 910b for calculating RBM-values. The computer program further comprises an allocating module 910c allocating vectoring resources to the lines, based on the calculated RBM-values.

The computer program 910 is in the form of computer program code structured in computer program modules. The modules 910a-c could essentially perform the actions of the flows illustrated in FIG. 1, to emulate the arrangement in a VCE illustrated in FIG. 8. In other words, when the different modules 910a-c are run on the processing unit 906, they correspond to the units 802-810 of FIG. 8.

Although the code means in the embodiment disclosed above in conjunction with FIG. 9 are implemented as computer program modules which when run on the processing unit causes the arrangement and/or VCE to perform the actions described above in the conjunction with figures mentioned above, at least one of the code means may in alternative embodiments be implemented at least partly as hardware circuits.

The processor may not only be a single CPU (Central processing unit), but could comprise two or more processing units in the devices. For example, the processor may include general purpose microprocessors, instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product comprises a computer readable medium on which the computer program is stored. For example, the computer program product may be a flash memory, a RAM (Random-access memory) ROM (Read-Only Memory) or an EEPROM (Electrically Erasable Programmable ROM), and the computer program modules described above could in alternative embodiments be distributed on different computer program products in the form of memories within the VCE.

Some Remarks

The invention is completely compliant with the ITU-T G.993.5 [1] standard. It can transparently support partial vectoring with its configuration parameters, i.e. target data/bit rate and line priority.

While the process as suggested above has been described with reference to specific embodiments provided as examples, the description is generally only intended to illustrate the inventive concept and should not be taken as limiting the scope of the suggested methods and arrangements, which are defined by the appended claims.

It is also to be understood that the choice of interacting units, as well as the naming of the units are only for exemplifying purpose, and VCEs suitable to execute any of the methods described above may be configured in a plurality of alternative ways in order to be able to execute the suggested process actions.

It should also be noted that the units described in this disclosure are to be regarded as logical entities and not with necessity as separate physical entities.

ABBREVIATIONS

CEI Crosstalk Effect Indicator (defined within this disclosure)
CPE Customer Premises Equipment
DSL Digital Subscriber Line
DSLAM Digital Subscriber Line Access Multiplexer
FEXT Far-end crosstalk
ODN Out-of-domain noise
RBM Rate balancing metric
SNR Signal-to-noise ratio
SXL Sorted crosstalker list
VCE Vectoring Control Entity
VDSL2 Very high speed digital subscriber line transceivers 2

REFERENCES

[1] Draft Recommendation ITU-T G.993.5 Self-FEXT Cancellation (Vectoring) for use with VDSL2 transceivers
[2] Recommendation ITU-T G.993.2 Very High Speed Digital Subscriber Line Transceivers 2 (VDSL2)

The invention claimed is:

1. A method in a Vector Control Entity associated with a plurality of digital subscriber lines forming a vectoring group comprising a group A of lines having the same priority, the method comprising:
when partial-vectoring resources are to be allocated among the lines within the vectoring group:
calculating a rate balancing metric, RBM, for each line i within the group A, indicative of a ratio between a bit rate of line i with a current vectoring resource allocation, and an estimated bit rate of line i assuming approximately no crosstalk within the vectoring group,
calculating an updated RBM for any line within the group A subjected to changes in vectoring resource allocation, and
allocating partial-vectoring resources to the line/s within the group A, based on the calculated RBMs, such as to reduce the difference in RBM between the lines, thus enabling a fair bit rate distribution among lines of similar priority when applying partial vectoring.

2. The method according to claim 1, wherein the allocation of partial-vectoring resources and a following update of RBM are repeated until one or more of the following apply:
a lowest RBM is equal to or larger than a predetermined threshold,
there are not vectoring resources sufficient for cancelling the crosstalk from another line within the vectoring group to a line within the group A, left to allocate, and
there are not vectoring resources sufficient for cancelling any crosstalk left to allocate.

3. The method according to claim 1, wherein any line within group A, of which the bit rate would exceed a predetermined maximal bit rate after a further allocation of vectoring resources is excluded from such allocation.

4. The method according to claim 1, wherein any line within group A, for which the crosstalk from the other lines within the vectoring group is approximately cancelled, is excluded from further allocation of vectoring resources.

5. The method according to claim 1, wherein partial-vectoring resources are allocated to a line having a low RBM, as compared to the other lines within group A.

6. The method according to claim 1, wherein partial-vectoring resources are allocated to the line having the lowest RBM within the group A.

7. The method according to claim 1, wherein partial-vectoring resources are re-allocated from one or more lines having a high RBM, as compared to the other lines within a group of lines having the same priority, when there are insufficient available vectoring resources left to allocate to a line which is to be joined to the vectoring group, or to a line which is to be upgraded to a higher priority.

8. The method according to claim 7, wherein the partial-vectoring resources are re-allocated from the one or more lines having the highest RBM, as compared to the other lines within a group of lines having the same priority.

9. An arrangement in a Vector Control Entity associated with a plurality of digital subscriber lines forming a vectoring group comprising a group A of lines having the same priority, the arrangement comprising:
a calculating unit, adapted to calculate a rate balancing metric, RBM, for each line i within the group A, indicative of a ratio between a bit rate of line i with current vectoring resource allocation, and an estimated bit rate of line i assuming approximately no crosstalk within the vectoring group, and further adapted to calculate an updated RBM for any line within the group A subjected to changes in vectoring resource allocation, and
an allocating unit, adapted to allocate vectoring resources to the line/s within the group A, based on the calculated RBMs, such as to reduce the differences in RBM between the lines, when partial-vectoring resources are to be allocated among the lines within the vectoring group, thus being adapted to enable a fair rate distribution among lines of similar priority when applying partial vectoring.

10. The arrangement according to claim 9, further adapted to repeat the allocation of partial-vectoring resources and a following update of RBM until one or more of the following apply:
a lowest RBM is equal to or larger than a predetermined threshold,
there are not vectoring resources sufficient for cancelling the crosstalk from another line within the vectoring group to a line within the group A, left to allocate, and
there are not vectoring resources sufficient for cancelling any crosstalk left to allocate.

11. The arrangement according to claim 9, further adapted to exclude any line within group A, of which the bit rate would exceed a predetermined maximal bit rate after a further allocation of vectoring resources, from such allocation.

12. The arrangement according to claim 9, further adapted to exclude any line within group A, for which the crosstalk from the other lines within the vectoring group is approximately cancelled, from further allocation of vectoring resources.

13. The arrangement according to claim 9, further adapted to allocate partial-vectoring resources to a line having a low RBM, as compared to the other lines within group A.

14. The arrangement according to claim 9, further adapted to allocate partial-vectoring resources to the line having the lowest RBM within the group A.

15. The arrangement according to claim 9, further adapted to re-allocate partial-vectoring resources from one or more lines having a high RBM, as compared to the other lines within a group of lines having the same priority, when there are insufficient available vectoring resources left to allocate to a line which is to be joined to the vectoring group, or to a line which is to be upgraded to a higher priority.

16. The arrangement according to claim 15, further adapted to re-allocate the partial-vectoring resources from the one or more lines having the highest RBM, as compared to the other lines within a group of lines having the same priority.

17. A non-transitory computer-readable storage medium, comprising computer readable code means, which when run in one or more processing units, causes a Vector Control Entity associated with a plurality of digital subscriber lines forming a vectoring group comprising a group A of lines having the same priority, to perform a method comprising:
    when partial-vectoring resources are to be allocated among the lines within the vectoring group:
        calculating a rate balancing metric, RBM, for each line i within the group A, indicative of a ratio between a bit rate of line i with a current vectoring resource allocation, and an estimated bit rate of line i assuming approximately no crosstalk within the vectoring group,
        calculating an updated RBM for any line within the group A subjected to changes in vectoring resource allocation and
        allocating partial-vectoring resources to the line/s within the group A, based on the calculated RBMs such as to reduce the difference in RBM between the lines, thus enabling a fair bit rate distribution among lines of similar priority when applying partial vectoring.

* * * * *

UNITED STATES PATENT AND TRADEMARK OFFICE
CERTIFICATE OF CORRECTION

Page 1 of 2

PATENT NO. : 8,953,760 B2
APPLICATION NO. : 13/814271
DATED : February 10, 2015
INVENTOR(S) : Lu et al.

Figure 4:
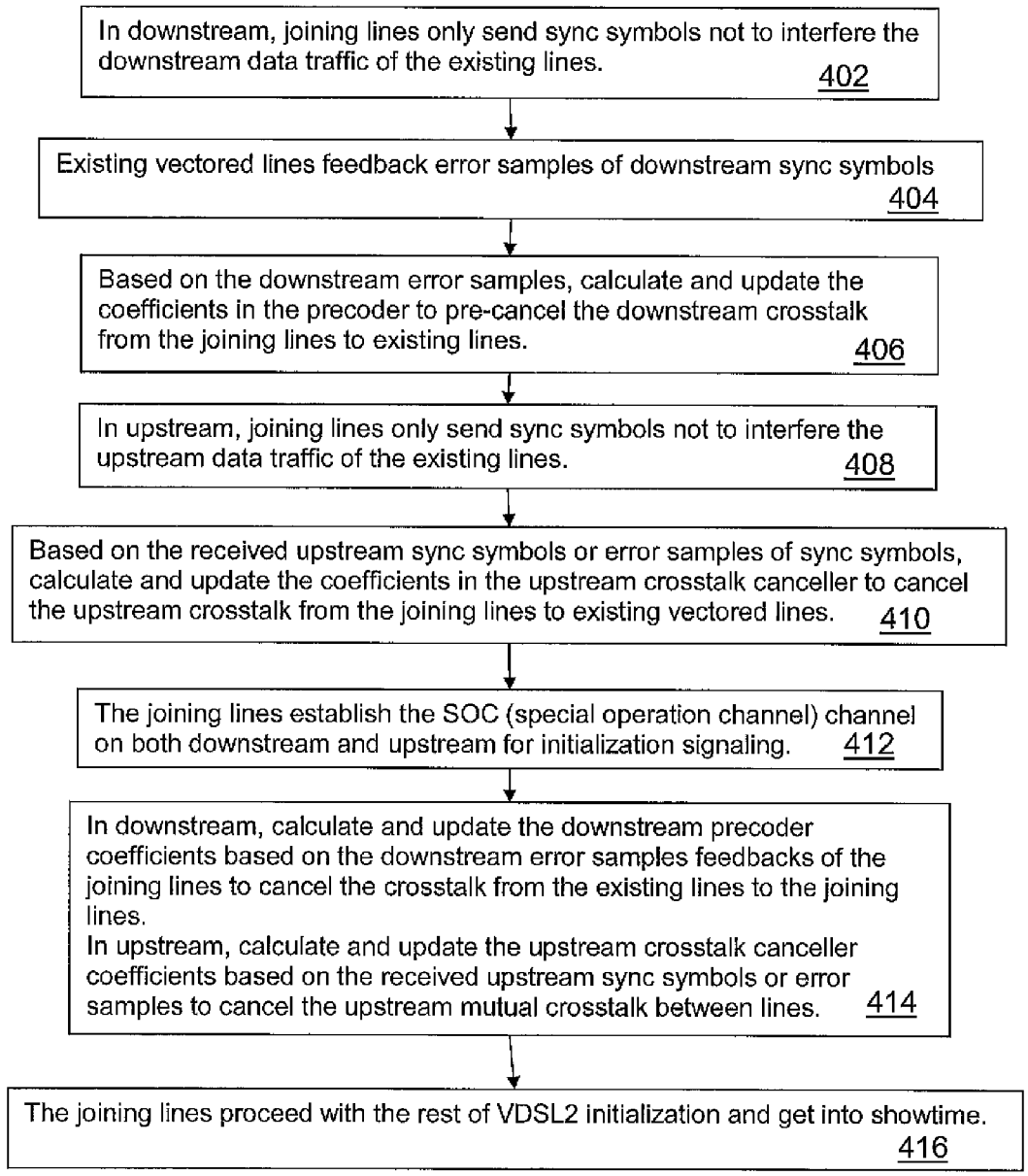
FIG. 4 is a flow chart illustrating initialization steps related to crosstalk cancellation, according to the prior art.

It is certified that error appears in the above-identified patent and that said Letters Patent is hereby corrected as shown below:

In the Drawings:

In Fig. 4, Sheet 4 of 9, in Step "404", in Line 1, delete "symbols" and insert -- symbols. --, therefor.

In the Specification:

In Column 1, Line 40, delete "crosstalk" and insert -- crosstalk. --, therefor.

In Column 1, Line 48, delete "1," and insert -- i, --, therefor.

In Column 6, Line 10, delete "$h_{ij}^k$" and insert -- $h_{ii}^k$ --, therefor.

In Column 6, Line 22, delete "$PSD_t^k$ is the transmit PSD of line t" and insert -- $PSD_i^k$ is the transmit PSD of line i --, therefor.

In Column 6, Line 25, delete "From the" and insert -- from the --, therefor.

In Column 6, Line 36, delete "$ISR_{ij}^k$ the" and insert -- $ISR_{ij}^k$ is the --, therefor.

In Column 7, Line 41, delete "$M_t^d$" and insert -- $M_i^d$ --, therefor.

In Column 7, Line 49, delete "$odnsr_t^k$" and insert -- $odnsr_i^k$ --, therefor.

In Column 9, Line 13, delete "the" and insert -- is the --, therefor.

In Column 9, Line 66, delete "each" and insert -- of each --, therefor.

In Column 10, Line 33, delete "respectively" and insert -- respectively. --, therefor.

Signed and Sealed this
Eighteenth Day of August, 2015

Michelle K. Lee
*Director of the United States Patent and Trademark Office*

CERTIFICATE OF CORRECTION (continued)
U.S. Pat. No. 8,953,760 B2

In Columns 10 & 11, Lines 66-67 & 1-3, delete "The...................service." and insert the same at Line 65, after "[1]." as a continuation paragraph.

In Column 11, Line 43, delete "M," and insert -- $M_i$ --, therefor.

In Column 12, Line 36, delete "$\tilde{M}_i$," and insert -- $\tilde{M}_i$ --, therefor.

In Column 15, Line 39, delete "808" and insert -- 806 --, therefor.

In Column 15, Line 52, delete "808" and insert -- 806 --, therefor.

In Column 15, Line 52, delete "802-810" and insert -- 802-806 --, therefor.